United States Patent
Pöpplow et al.

(10) Patent No.: US 7,026,799 B2
(45) Date of Patent: Apr. 11, 2006

(54) CIRCUIT ASSEMBLY FOR OPERATING A LUMINOUS SIGNAL

(75) Inventors: Norbert Pöpplow, Eichwalde (DE); Dirk Zimmermann, Berlin (DE)

(73) Assignee: Siemens Aktiengellschaft, Munich (DE)

( * ) Notice: Subject to any disclaimer, the term of this patent is extended or adjusted under 35 U.S.C. 154(b) by 0 days.

(21) Appl. No.: 10/498,230

(22) PCT Filed: Dec. 5, 2002

(86) PCT No.: PCT/DE02/04505

§ 371 (c)(1), (2), (4) Date: Jun. 10, 2004

(87) PCT Pub. No.: WO03/053110

PCT Pub. Date: Jun. 26, 2003

(65) Prior Publication Data

US 2005/0029961 A1 Feb. 10, 2005

(30) Foreign Application Priority Data

Dec. 14, 2001 (DE) ................................ 101 64 561

(51) Int. Cl.
*G05F 1/613* (2006.01)

(52) U.S. Cl. ................ 323/229; 323/230; 323/224
(58) Field of Classification Search ................ 323/229, 323/230, 224, 222, 228; 307/139, 140, 143; 315/137, 224, 125–128, 291, 307, 312, 324, 315/185 S, 200 A
See application file for complete search history.

(56) References Cited

U.S. PATENT DOCUMENTS

| | | | | |
|---|---|---|---|---|
| 4,198,629 A | * | 4/1980 | Marion | 345/46 |
| 4,731,830 A | * | 3/1988 | Thomson | 379/395.01 |
| 5,013,926 A | * | 5/1991 | Aizawa | 250/551 |
| 5,959,413 A | * | 9/1999 | Komarek et al. | 315/306 |
| 6,014,600 A | * | 1/2000 | Ferri et al. | 701/29 |

* cited by examiner

*Primary Examiner*—Tuyet Thi Vo
(74) *Attorney, Agent, or Firm*—Morrison & Foerster LLP

(57) ABSTRACT

The invention relates to a circuit assembly for operating a luminous signal, particularly an LED signal, comprising at least one light-emitting diode (D) to which a resistance (R) is serially connected and a control (St) is connected in parallel. In order to adjust the luminous power of the luminous signal to various degrees of brightness during the day and at night, the control (St) is provided with a controlled source of current so as to specify a parallel current (I_P) which reduces the current (I_D) flowing through the light-emitting diode (D).

3 Claims, 2 Drawing Sheets

CIRCUIT ASSEMBLY FOR OPERATING A LUMINOUS SIGNAL

CLAIM FOR PRIORITY

This application claims priority to International Application No. PCT/DE02/04505 which was published in the German language on Jun. 26, 2003, which claims the benefit of priority to German Application No. 101 64 561.9, which was filed in German language on Dec. 14, 2001.

TECHNICAL FIELD OF THE INVENTION

The invention relates to a circuit assembly for operating a luminous signal.

BACKGROUND OF THE INVENTION

Illuminated signs based on light-emitting diodes instead of incandescent lamps are being used increasingly in many areas, especially for signaling. Light-emitting diodes are comparatively cost-effective, have a long life and produce a strong light. U.S. Pat. No. 5,939,839 discloses a circuit for protecting the light-emitting diodes of a light signal against overvoltages. European Application No 0 293 921 relates to a circuit which protects light-emitting diodes against overheating. However, it is difficult to use light-emitting diodes where incandescent lamps are intended to be replaced by LED illuminated signs without any changes to the drive. This is particularly true of light signal circuits for railroads, in which correct operation is generally monitored by current measurement which is safe from the signaling point of view. In order to allow this monitoring still to be used without any changes, the current/voltage characteristic of the LED illuminated sign must correspond approximately to that of an incandescent lamp.

A further special feature is signaling outside tunnels or environmental conditions with approximately constant light characteristics. In this case, the circuitry must provide a reduction in the light power for night time operation, in comparison to that for daytime operation. The light sensitivity of the human eye during daytime differs by a factor of approximately 1000 from the light sensitivity at night. If the light power is not reduced at night, dazzling is therefore possible even in the case of lights which are barely perceptible in the daytime. However, it is essential to avoid dazzling, particularly for road or rail traffic, since there is a risk of other signals effectively possibly being overlooked due to the excess radiation. In the case of light signals based on incandescent lamps for railroad purposes, the brightness is controlled between daytime and night by the control mechanism using the supply voltage or the supply current. Since the light power of an incandescent lamp depends exponentially on the supply voltage or the supply current, a small change in the supply current or the supply voltage leads to a major change in the light power. This means that the supply current or the supply voltage need be reduced only to about ⅔ of the initial value in order to reduce the light power, for example, to 20% of the initial light intensity. In order to achieve a similarly advantageous characteristic profile for light-emitting diodes, a proposal has been made, according to DE 198 46 753 A1, for a drive circuit to be connected in parallel with each light-emitting diode. This has the disadvantage that the achievable difference between the light power in the daytime and the night is relatively small. Furthermore, component tolerances which lead to different forward voltages on the light-emitting diodes, transistors and other components, as well as the influence of temperature on the forward voltages, are not compensated for.

SUMMARY OF THE INVENTION

The invention discloses a circuit assembly which allows an increased dynamic range between daytime and night light power.

According to one embodiment of the invention, by presetting the parallel current which does not flow through the light-emitting diode, the light power of the light-emitting diodes can be controlled over a very wide range. In this case, in order to allow a constant light-emitting diode current in spite of different operating voltages during daytime and night time operation, a second controlled current source for presetting the light-emitting diode current is provided.

However, it is also possible to achieve a constant current flow of the light-emitting diode without any further controlled current source. This is done by controlling the parallel current as a function of the operating voltage, rather than by keeping it constant.

According to another embodiment of the invention, a nominal/actual value comparison is carried out by means of a comparator for the parallel current to be controlled and, if appropriate, also the light-emitting diode current to be controlled. The nominal value of the respective current is in this case preset by predefined switching thresholds, which predetermine when the corresponding currents should be switched on and off. The switching thresholds may be analogue continuous presets or else purely digital information, which then preferably has hysteresis.

In one advantageous embodiment of the invention, the switching threshold has temperature compensation and/or forward voltage compensation applied to it. The temperature compensation compensates for component characteristics which vary as a function of the temperature. The forward voltage compensation compensates for different forward voltages of the light-emitting diodes that are used. For example, it is feasible for the light-emitting diodes which are used to be subdivided into forward voltage groups, from which the appropriate light-emitting diodes to be fitted are selected.

In another embodiment of the invention, the assembly can produce a current even at low voltages. This function protects the circuit arrangement against input external energy, which can occur when the circuit arrangement is being supplied in a relatively long distance. Even when the input external energy is at the maximum level to be assumed, the voltage which is built up across the light-emitting diode must remain less than the forward voltage of the light-emitting diode. This prevents the light-emitting diode from starting to illuminate inadvertently when external energy is flowing—an interference voltage.

BRIEF DESCRIPTION OF THE DRAWINGS

The invention will be explained in more detail in the following text using illustrations in the figures, in which.

DETAILED DESCRIPTION OF THE INVENTION

Figure 1:
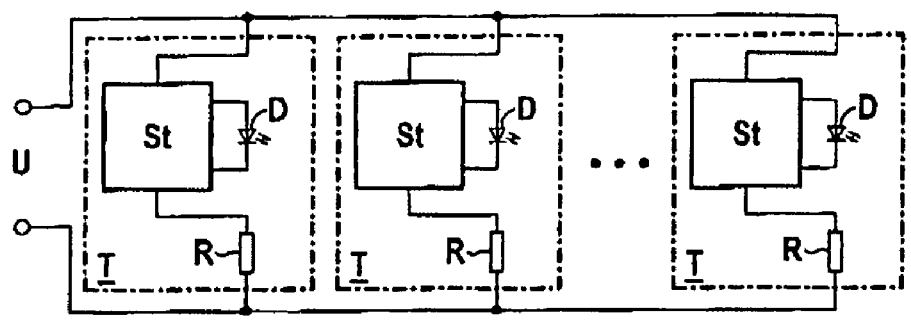
FIG. 1 shows an outlet circuit diagram of a circuit arrangement for operating an illuminated sign.

FIG. 1 shows a general configuration of an LED signal with n drivers T, with each driver T controlling at least one LED D. At least one LED controller St is connected in parallel with each of the LEDs D. One pole of the LED controller St is connected directly to the operating voltage U, while the other pole is connected in series with a resistor R to the operating voltage U. The resistor R is distinguished by having a defined failure behavior, that is to say certain defects, for example complete short circuits, are so improbable that, effectively, they do not occur. The resistors R are furthermore designed such that faults, for example a short circuit, of the LED D or LED controller St have only a minor effect on the overall current drawn by the circuit arrangement. For example, in the event of a short circuit of the LED controller St in the case of an LED signal with 60 drivers T, the total current would increase by only about 5%.

Figure 2:
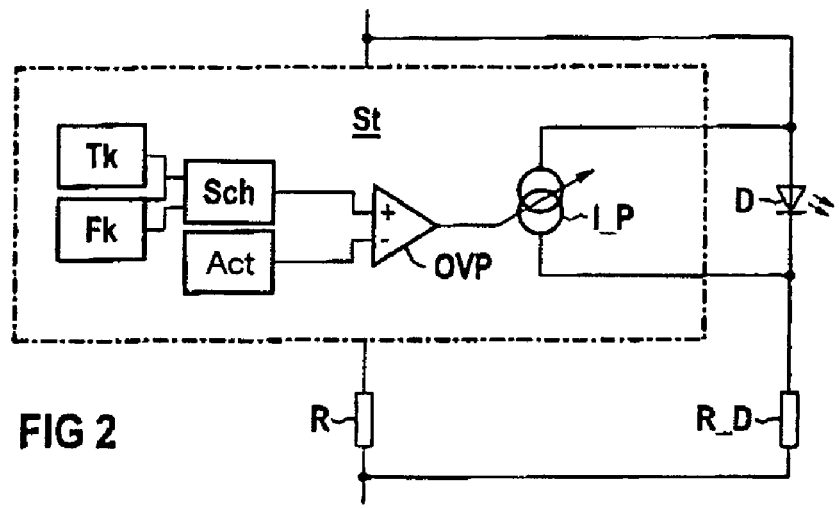
FIG. 2 shows a first embodiment of a drive circuit.

A first embodiment of a driver T is shown in FIG. 2 as a detail of the LED signal from FIG. 1. The LED controller St sets a current I_P in parallel with the LED D. This is done by using a controlled current source. A comparator, in this case an operational amplifier OPV, is connected on the input side to a switching threshold Sch, which represents a nominal value, and to an actual value sensor Act. On the output side, the operational amplifier OPV acts on a parallel path to the LED D. The switching threshold Sch predetermine when the parallel current I_P should be switched for daytime operation, or night operation or to an idle level. The switching threshold Sch itself has temperature compensation Tk and forward voltage compensation Fk applied to it. The temperature compensation Tk compensates for temperature-dependent component characteristics, while the forward voltage compensation Fk takes account of LED-specific forward voltages. The actual valve sensor Act processes the operating voltage U and/or the operating current of the entire LED signal, although the actual value can also be preset by further information, such as additional control lines from a control mechanism or else by information which is encrypted in the supply current or in the supply voltage U. The current source for the parallel current I P is designed such that it can produce a current even at low voltages. In consequence, input external energy, whose order of magnitude depends to a major extent on the length of the supply line, is short-circuited in such a way that it is impossible for a high voltage to build up, or for the LEDs D to start to illuminate as a result of the external energy.

Figure 3:
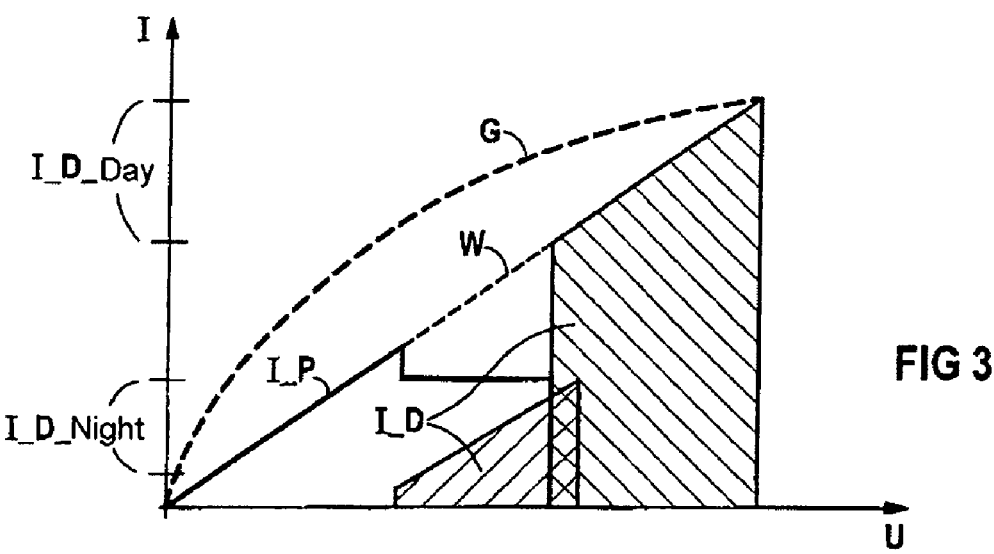
FIG. 3 shows a characteristic profile of the drive circuit shown in FIG. 2.

FIG. 3 shows the supply-voltage-dependent current profile of the parallel current I_P and of the current I P flowing through the LED D in comparison to a conventional incandescent lamp G. The figure shows a resistance line W, which is governed by the resistors R, as would occur if only the resistors R were present, and there were no drivers T or LEDs D. The resistance line W describes the maximum possible current flow through the circuit arrangement according to FIG. 2 as a function of the operating voltage U. With this circuit embodiment, the voltage is reduced at night by controlling the parallel current I_P. As can be seen from FIG. 3, the LED current I_D is not constant either in the daytime or in the night time voltage range.

Figure 4:
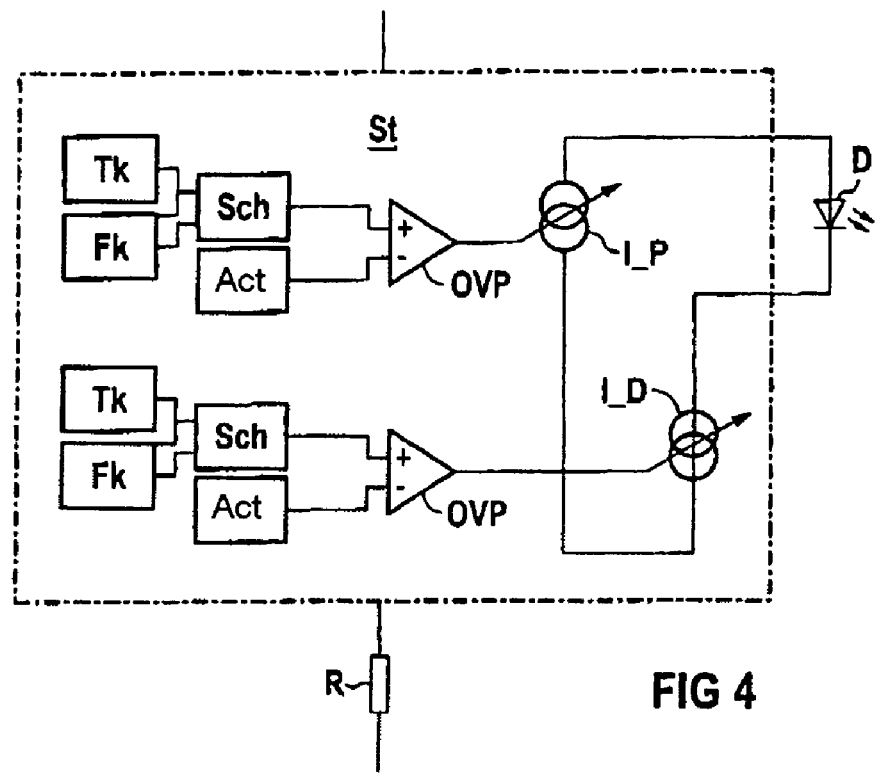
FIG. 4 shows a second embodiment of a drive circuit.
Figure 5:
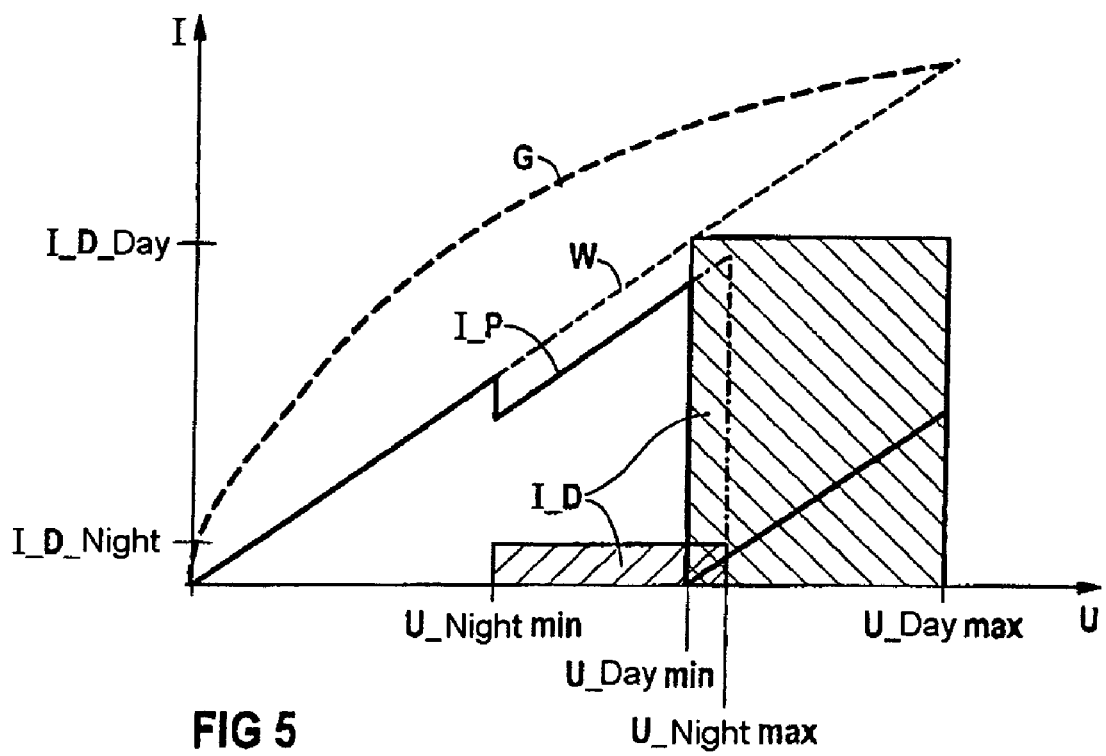
FIG. 5 shows a characteristic profile for a drive circuit as shown in FIG. 4.

A circuit embodiment with an additional LED current controller is suitable for achieving a constant current flow. A circuit arrangement such as this is shown in FIG. 4. In this case, the parallel current I_D and, in addition, the LED current I_D as well are controlled by means of controlled current sources. FIG. 5 shows the associated current profile. The current that is set and hence the signal brightness are ideally constant during daytime operating as well as during night time operation.

When the signal is switched off, $0<=U\_night\ min$, the signal does not illuminate even when input external energy is present. The LED current I_D is =0. However, the parallel current I_P ideally corresponds to the maximum possible current. Any input external energy is short-circuited by this parallel current I_P, so that it is impossible for any voltage to build up that will cause the LEDs D to illuminate.

During night time operation $U\_night\ min<=U\_night\ max$, the LED controller St sets the LED current $I\_D=I\_D\_night$ through the LED D. The LEDs D illuminate with a low light power level. The parallel current I_P ideally corresponds to the difference between the current which is defined by the resistors R and LED current I_D.

During daytime operation $U\_day\ min<=U\_day\ max$, the LED controller St sets the LED current $I\_D=I\_D\_day$ through the LED D. The LEDs D illuminate with the maximum light power. The parallel current I_P once again corresponds to the difference between the current which was defined by the resistors R and the LED current I_D.

In the overlapping area between daytime and night time operation, the hysteresis for the parallel current I_P and the LED current I_D results in the LED signal remaining in a stable state.

The circuit arrangement shown in FIG. 4 represents a very convenient embodiment. The LED signal is safe in the signalling sense of the word, has high stability, is virtually free of temperature and component fluctuations, and provides a very wide dynamic range between daytime and night time operation. However, this convenience involves a correspondingly high level of circuitry complexity. This high level of complexity can preferably be countered by means of integrated technology. Simplified versions are also feasible, providing only some of the functionalities, with reduced complexity.

One embodiment takes account of the fact that the maximum possible light power shall be achieved during the daytime while, however, at night the light power is limited to a defined level. For this purpose, the LED current I_D is kept constant only in the range between U_night min and U_night max, while the maximum possible LED current I_D of I_P=0 is used in the range between U_day min and U_day max.

A further embodiment relates to the configuration for DC and AC voltage. For this purpose, LED controllers St can be equipped with appropriate rectified diodes. When operating using AC voltage, it is worthwhile designing the LED controller St such that root mean square values are used for the comparison with nominal values, rather than instantaneous values of the actual values.

It is also possible to design an LED controller St for both DC voltage and AC voltage, since an LED controller St for AC voltage also operates in the DC voltage mode. However, in this case, it should be remembered that different switching thresholds Sch may possibly be required. The required voltage type can be selected by means of externally accessible programming.

The invention is not restricted to the exemplary embodiments specified above. In fact, a number of variants are feasible which make use of the invention even with the features being configured in fundamentally different ways.

The invention claimed is:
1. A circuit arrangement for operating a luminous signal, comprising:

at least one light-emitting diode, with which a resistor is connected in series and a controller is connected in parallel, wherein the controller has a first controlled current source for presetting a parallel current which reduces the current flowing through the light-emitting diode, a second controlled current source for presetting a current flowing through the light-emitting diode, and the first controlled current source has a comparator whose inputs are acted on by a switching point and an actual value sensor.

2. The circuit arrangement as claimed in claim 1, wherein a switching threshold is acted on by temperature compensation and/or forward voltage compensation.

3. The circuit arrangement as claimed in claim 1, wherein to preset the parallel current, the first controlled current source has a device for driving a current such that, when a maximum expected external energy is input, a voltage which builds up across the light-emitting diode is less than a forward voltage of the light-emitting diode.

* * * * *